United States Patent [19]
Kakizakai

[11] Patent Number: 5,503,718
[45] Date of Patent: Apr. 2, 1996

[54] METHOD OF ETCHING ALUMINUM FOIL FOR ELECTROLYTIC CAPACITORS

[75] Inventor: Kaoru Kakizakai, Chichibu, Japan

[73] Assignee: Nihon Chikudenki Kogyo Kabushiki, Tokyo, Japan

[21] Appl. No.: 391,863

[22] Filed: Feb. 22, 1995

[30] Foreign Application Priority Data

Mar. 10, 1994 [JP] Japan .................................. 6-065467

[51] Int. Cl.$^6$ ........................................ C25F 3/04
[52] U.S. Cl. ................ 216/6; 205/660; 205/674; 205/682; 205/684; 205/685; 216/103
[58] Field of Search ............ 204/129.1, 129.75, 204/129.95; 156/665

[56] References Cited

U.S. PATENT DOCUMENTS

| | | | |
|---|---|---|---|
| 4,420,367 | 12/1983 | Löcher | 204/129.35 X |
| 4,474,657 | 10/1984 | Arora | 204/129.75 |
| 4,518,471 | 5/1985 | Arora | 204/129.1 |
| 4,525,247 | 6/1985 | Arora | 204/129.75 |

*Primary Examiner*—Donald R. Valentine
*Attorney, Agent, or Firm*—Jordan and Hamburg

[57] ABSTRACT

A method of etching an aluminum foil for electrolytic capacitors, comprising the steps of electrolytically etching an aluminum foil for electrolytic capacitors that has a high cubic texture in an electrolyte containing a chloride to form pits, and enlarging the pits formed in the above step by etching, in which step of forming pits the current density is increased from 0 to a maximum value quickly and then is decreased gradually.

17 Claims, 7 Drawing Sheets

METHOD OF ETCHING ALUMINUM FOIL FOR ELECTROLYTIC CAPACITORS

FIELD OF THE INVENTION

The present invention relates to a method of etching an aluminum foil for electrolytic capacitors that is improved in etching efficiency.

DESCRIPTION OF THE PRIOR ART

Conventionally, a method of producing an aluminum electrode foil for electrolytic capacitors for high and medium voltages that is high in effective surface gain and specific capacitance is carried out. In this method, an aluminum foil for electrolytic capacitors that has a high cubic texture is etched in an electrolyte containing chloride ions with a direct current. This etching includes a first step of forming tunnel pits in the <100> direction of the crystal orientation and a second step of enlarging the pits formed in the first step by electrolytic etching or chemical etching.

Generally, in this step of forming tunnel pits, the number and the distribution of pits where etching is started are related to the magnitude of the applied current density for electrolysis and the dissolved amount of the foil is approximately in proportion to the quantity of the electricity. Therefore, in order to increase the specific capacitance of the aluminum foil for electrolytic capacitors, the current density for electrolysis is set large to form dense tunnel pits, and the quantity of applied electricity is increased to increase the effective surface gain of the foil.

In this step of forming tunnel pits, dense pits are not formed throughout the foil simultaneously, but first, pits are grown in the foil sparsely as shown in FIG. 12, and when the growth stops, the formation of next pits begins, and in that way tunnel pits are gradually formed densely throughout the foil. Therefore, as the etching progresses, the density of pits increases gradually and unetched part on the foil surface decreases gradually.

However, in such a conventional step of forming pits, since the direct current is applied to the foil under constant conditions for the applied time, along with the etching the current density for electrolysis for the decreased unetched part becomes gradually excessive. As a result, the formed tunnel pits are etched excessively, the etched amount is increased, and the etched foil surface comes off. Accordingly in spite of the increase in the etched amount, the effective surface area is not increased and on the contrary the physical strength of the foil is lowered, which is a defect.

SUMMARY OF THE INVENTION

An object of the present invention is to provide a method of etching an aluminum foil for electrolytic capacitors that is high in etching efficiency and does not lower the physical strength of the etched aluminum foil.

The present method of etching an aluminum foil for electrolytic capacitors comprising the steps of electrolytically etching an aluminum foil for electrolytic capacitors that has a high cubic texture in an electrolyte containing a chloride to form pits in the foil and enlarging the pits formed in the above step by electrolytic etching or by chemical etching, wherein the electric current for electrolysis applied during the step of forming pits is decreased from a maximum value continuously or stepwise so that the current density for electrolysis for the unetched part is kept approximately constant with the course of time. In this way, the etched surface in the first step of forming pits and the second step of enlarging the pits can be prevented from coming off and the capacitance per etched amount (hereinafter referred to as etching efficiency) is improved.

The present inventor has performed experiments repeatedly and have found the following points. When the ratio of A/B is over 0.4 wherein A is the time taken by the current density in the step of forming tunnel pits to reach a maximum value from 0, and B is the time taken by the current density in the step of forming tunnel pits that is decreased continuously or stepwise to reach an end value from the maximum value, the current density for the unetched part that is decreased continuously or stepwise along with the progress of the electrolytic etching becomes excessive. At the same time, the growth of the tunnel pits becomes excessive to cause the etched foil surface to come off thereby lowering the etching efficiency. However, in the case wherein the ratio of A/B is in the range of 0 to 0.4, there is such an effect that the etched foil surface does not come off undesirably and therefore the etching efficiency is improved.

Further, if the maximum current density is smaller than 350 mA/cm$^2$, the number of pits becomes insufficient while if the maximum current density is larger than 1,000 mA/cm$^2$, tunnel pits are formed too densely and therefore the aluminum foil surface comes off. Accordingly, it is effective that the maximum current density is in the range of 350 to 1,000 mA/cm$^2$.

Further, if the current density at the final stage is larger than 300 mA/cm$^2$, the current density for the reduced unetched part becomes excessive to lower the etching efficiency. Therefore, preferably the current density at the final stage is in the range of 0 to 300 mA/cm$^2$.

Further, if the content of hydrochloric acid in the electrolyte used in the step of forming tunnel pits is less than 1.0% by weight, or the content of an acid capable of forming an oxide film is less than 15% by weight, or the electrolyte temperature is lower than 65° C., the formation of tunnel pits becomes unsatisfactory. Further, if the content of hydrochloric acid is more than 4.0% by weight or the content of an acid capable of forming an oxide film is more than 30% by weight, or the electrolyte temperature is higher than 90° C., the formation of tunnel pits becomes excessive. Therefore preferably, the content of hydrochloric acid is 1.0 to 4.0% by weight, the content of an acid capable of forming an oxide film is 15 to 30% by weight, and the temperature of the electrolyte is 65° to 90° C. As the acid capable of forming an oxide film, sulfonic acid, phosphoric acid, nitric acid, and oxalic acid are suitable.

In the next step of enlarging the pits, new tunnel pits are prevented from being produced. Further, the etched foil surface can be kept from coming off, which will otherwise be brought about because the dissolution near the surface of the aluminum foil will be increased in comparison with the tips of the tunnel pits. Therefore, the pits formed in the step of forming pits are enlarged efficiently.

Further, in the case wherein the current density in the step of forming pits is decreased from a maximum value stepwise, a case wherein the change of the current density between the steps during the reduction from the maximum value of the current density to the final value is over 200 mA/cm$^2$ and a case wherein the retention time of the constant current density of each step is over 15 sec cannot keep the optimum current density for the unetched part that is reduced along with the progress of the electrolysis. Therefore preferably the change in the current density between the steps is 0 to 200 mA/cm$^2$ and the retention time of each step is 0 to 15 sec.

Since the present invention is a method wherein the current density applied during the formation of pits is decreased from a maximum value with the course of time, a high etching efficiency can be obtained. Further, the quantity of electricity consumed in etching is reduced and the physical strength of the obtained aluminum etched foil is excellent.

DESCRIPTION OF THE PREFERRED EXAMPLES

Figure 1:
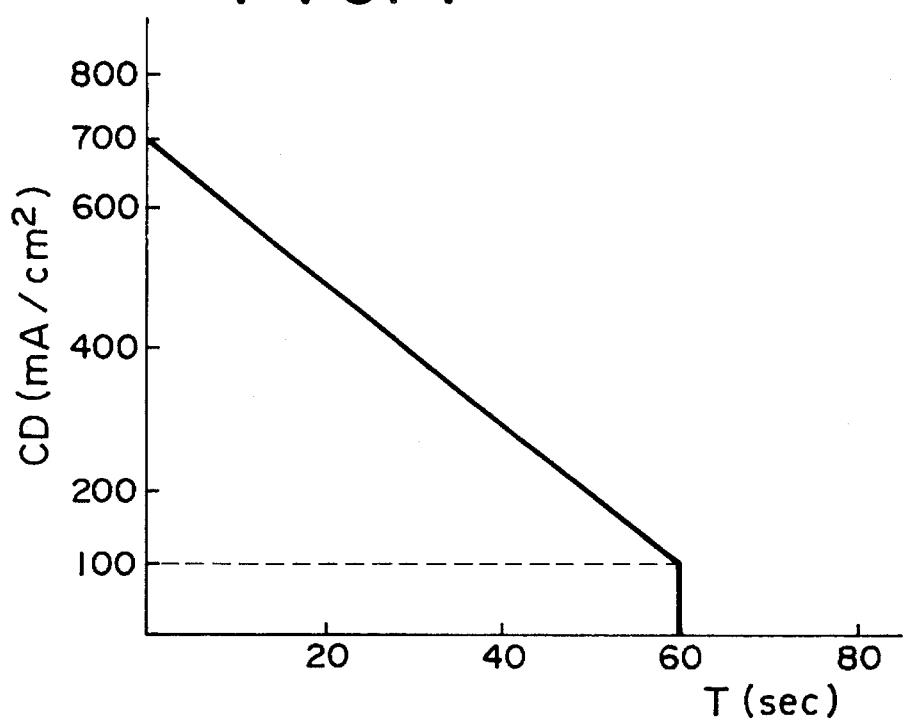
FIG. 1 is a graph of the current density showing a first Example of the present invention.

Referring to FIG. 1, a first Example of the present invention is described. FIG. 1 shows the current density applied in the step of forming tunnel pits with the course of time. The current density ($mA/cm^2$) is plotted along the ordinate axis and the time (sec) is plotted along the abscissa axis. Herein, as an aluminum foil, a soft tempered material having a high cubic texture with a purity of 99.99% and a thickness of 104 μm was used. As an electrolyte, an aqueous solution containing 2.0% by weight of hydrochloric acid and 20.0% by weight of sulfuric acid was used. In this solution, the first step of etching was carried out to form tunnel pits. The current density was decreased continuously from a maximum value of 700 $mA/cm^2$ to reach a final value of 100 $A/cm^2$ after 60 sec.

Then, the second step of chemical etching in the same electrolyte as used above was carried out to grow and enlarge the tunnel pits, the foil was rinsed with water, and the foil was dried and subjected to the conventional formation treatment at 360 V that is generally carried out. Properties of the thus obtained aluminum electrode foil are shown in Table 1. In Table 1, other Examples given below and Conventional Example are shown comparatively.

FIGS. 2 to 7 and 10 are graphs of the current density showing a second Example to a seventh Example of the present invention and Conventional Example. The experimental conditions in these Examples were the same as those in the first Example and therefore are not described in detail.

Figure 2:
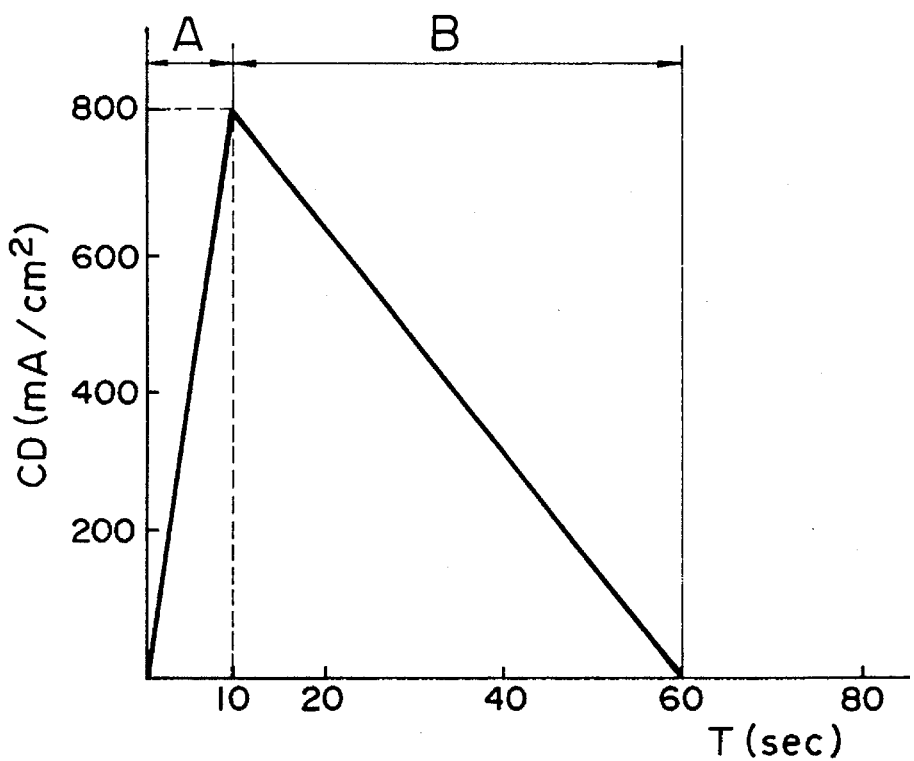
FIG. 2 is a graph of the current density showing a second Example of the present invention.
Figure 3:
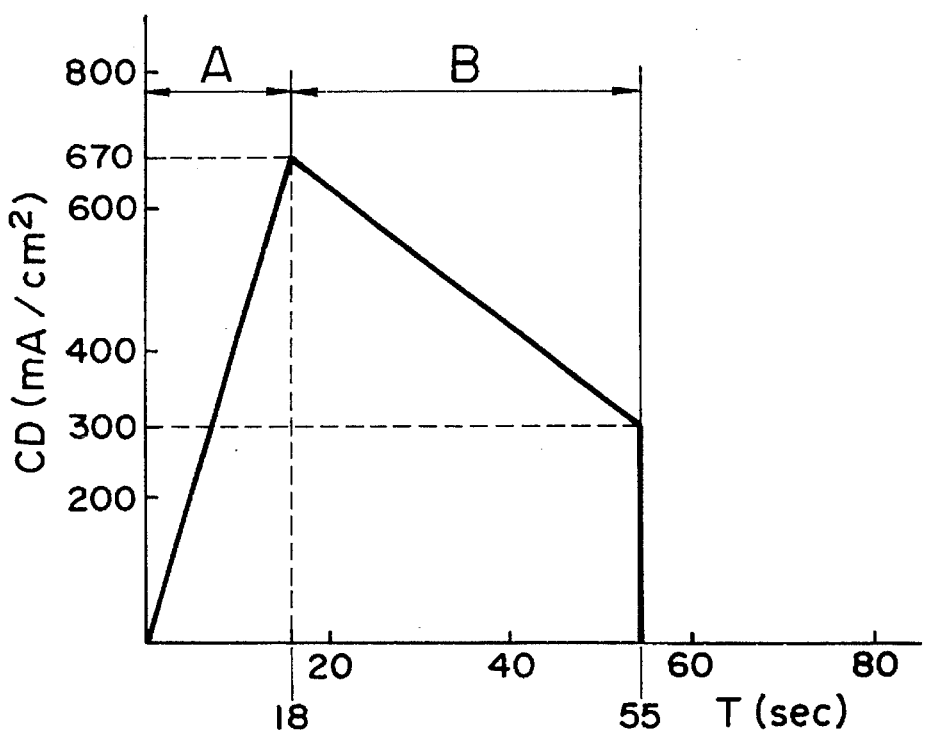
FIG. 3 is a graph of the current density showing a third Example of the present invention.
Figure 4:
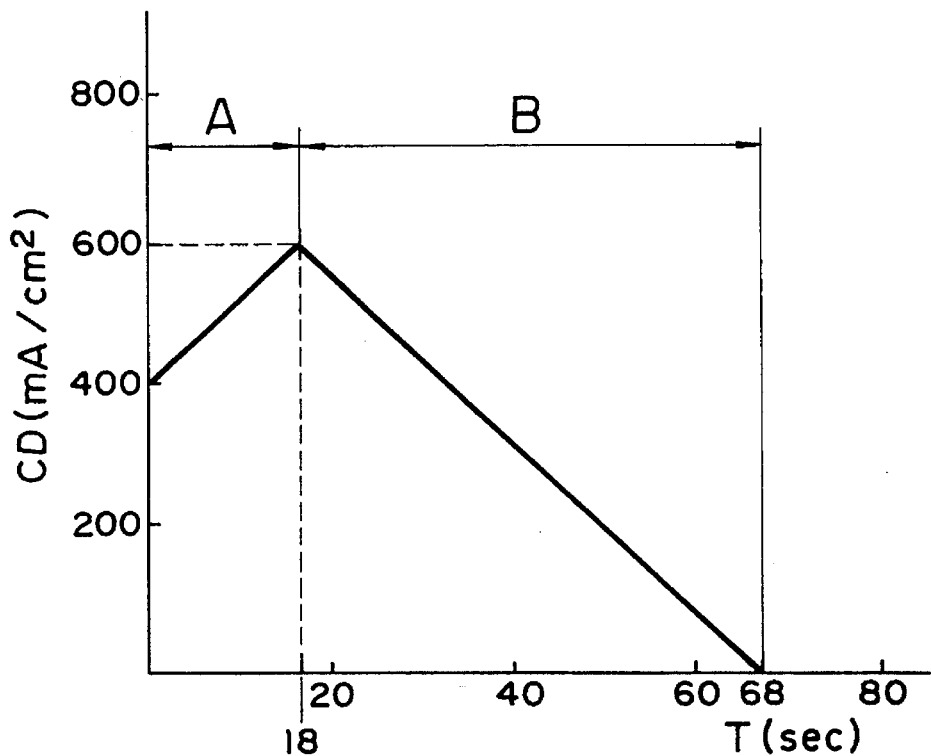
FIG. 4 is a graph of the current density showing a fourth Example of the present invention.
Figure 5:
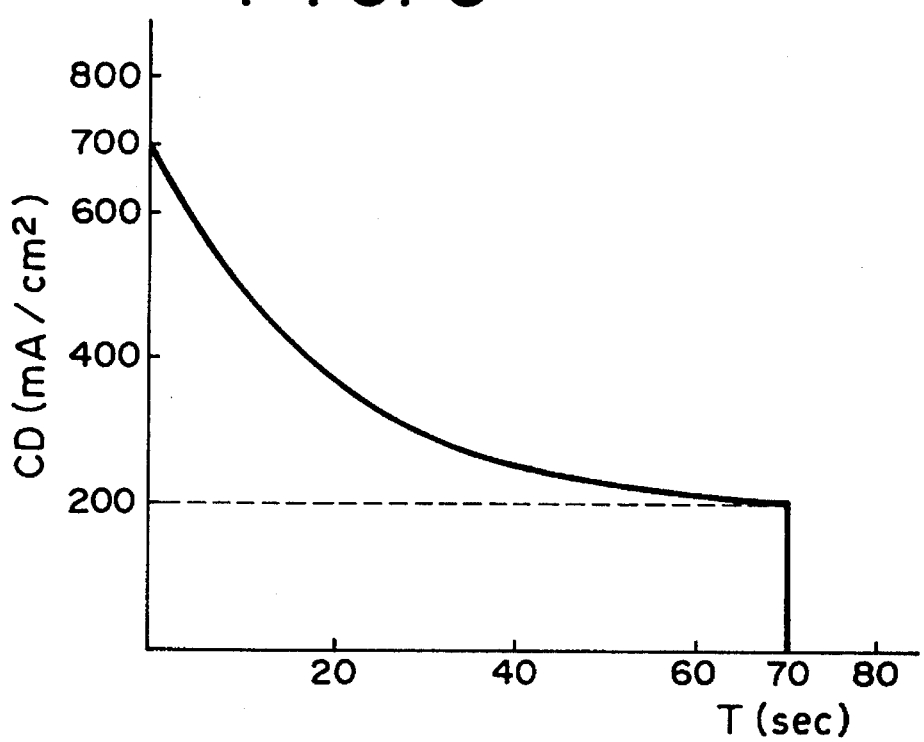
FIG. 5 is a graph of the current density showing a fifth Example of the present invention.
Figure 6:
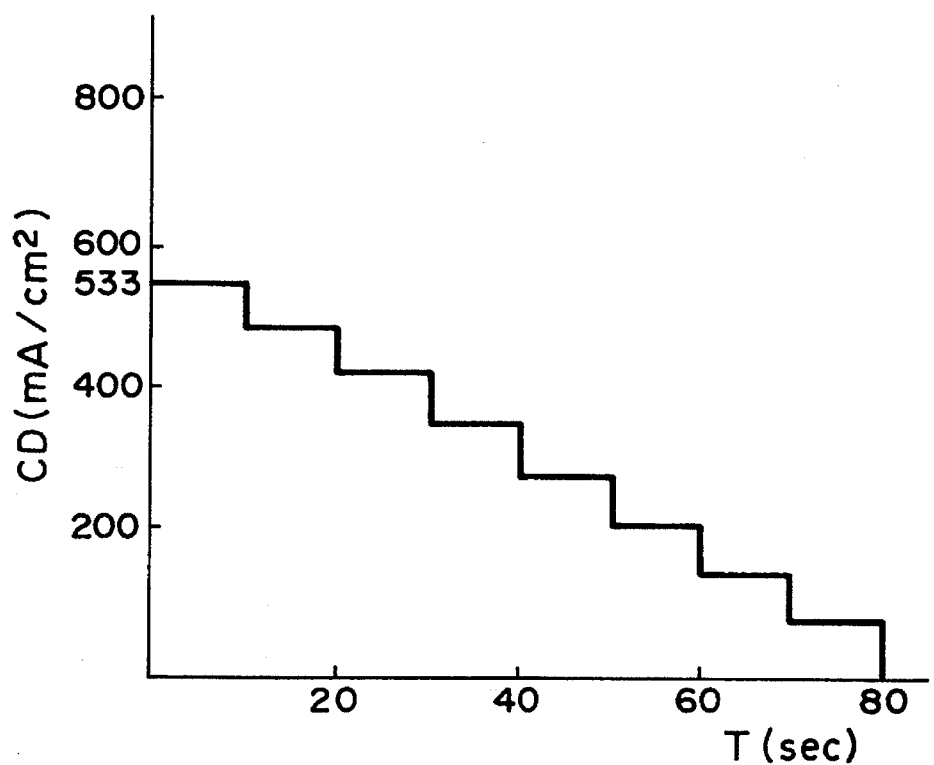
FIG. 6 is a graph of the current density showing a sixth Example of the present invention.
Figure 7:
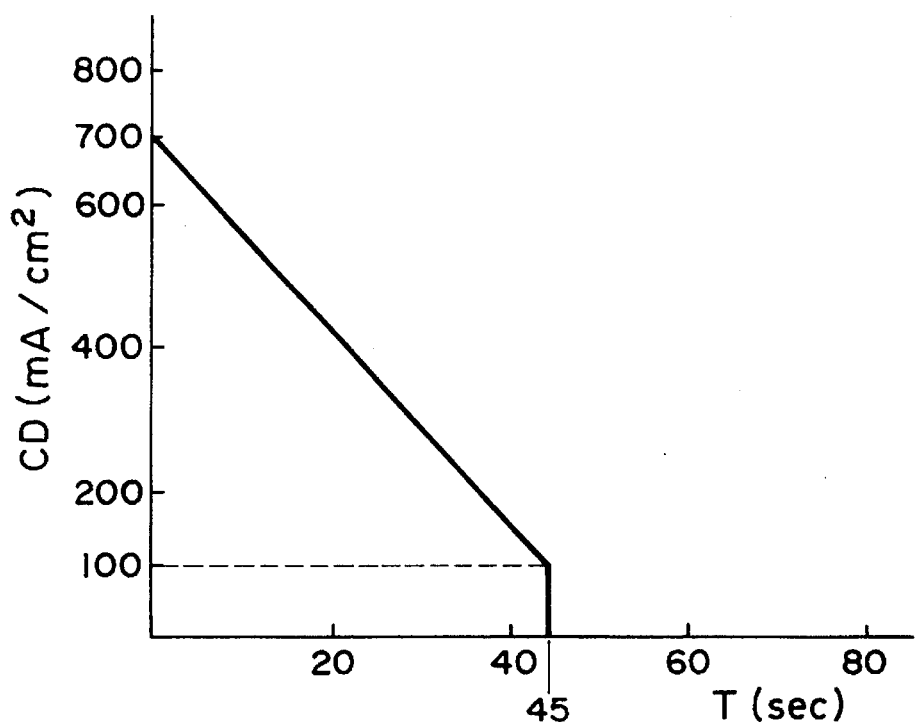
FIG. 7 is a graph of the current density showing a seventh Example of the present invention.
Figure 10:
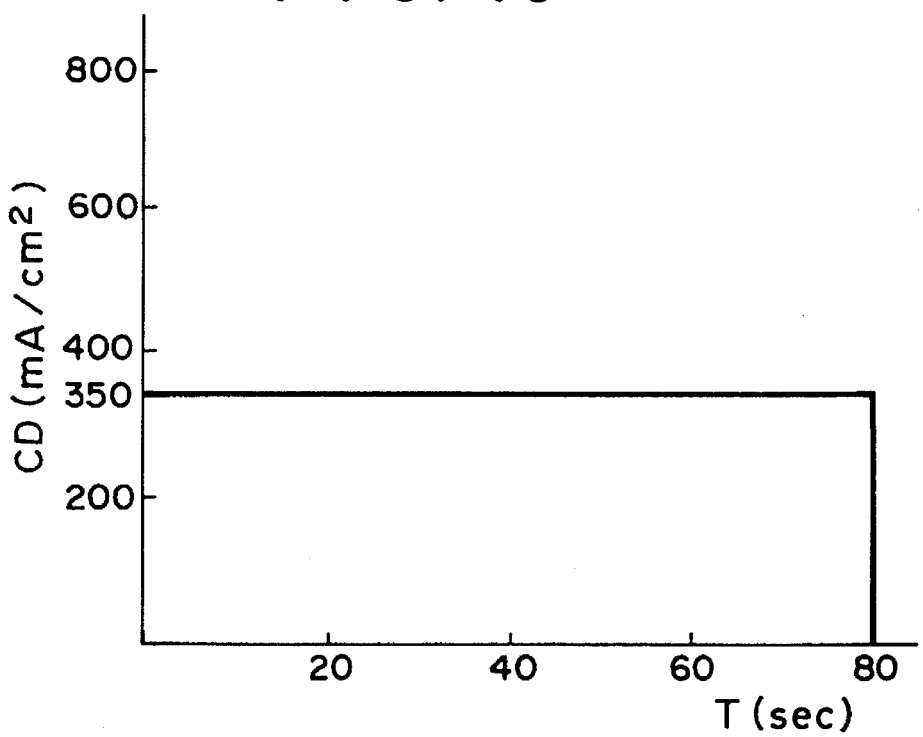
FIG. 10 is a graph of the current density by a conventional method.

Referring to FIG. 2, the current density of the second Example was increased from 0 quickly to a maximum value of 800 $mA/cm^2$ in 10 sec and then was dropped and after 60 sec the current density was caused to reach the end. In the figure, A denotes the time taken by the current density to reach the maximum value and B denotes the time taken by the current density to reach the end from the maximum value. Referring to FIG. 3, the current density of the third Example was increased from 0 quickly, .was caused to reach a maximum value of 670 $mA/cm^2$ after 18 sec, and then was dropped continuously, and after 55 sec the current density was caused to reach an end value of 300 $mA/cm^2$. Referring to FIG. 4, the current density of the fourth Example was increased continuously from 400 $mA/cm^2$, was caused to reach a maximum value of 600 $mA/cm^2$ after 18 sec, and then was dropped continuously, and after 68 sec the current density was caused to reach the end. Referring to FIG. 5, the current density of the fifth Example was decreased quickly from 700 $mA/cm^2$ and then the rate of the decrease was lowered and after 70 sec the current density was caused to reach an end value of 200 $mA/cm^2$. Referring to FIG. 6, the current density of the sixth Example was decreased stepwise from 533 $mA/cm^2$ and after 80 sec the current density was caused to reach the end. Referring to FIG. 7, the current density of the seventh Example was decreased from 700 $mA/cm^2$ and after 45 sec the current density was caused to reach an end value of 100 $mA/cm^2$. FIG. 10 shows a conventional method wherein the current density had a constant value of 350 $mA/cm^2$ and after 80 sec the current density was caused to reach the end.

Figure 8:
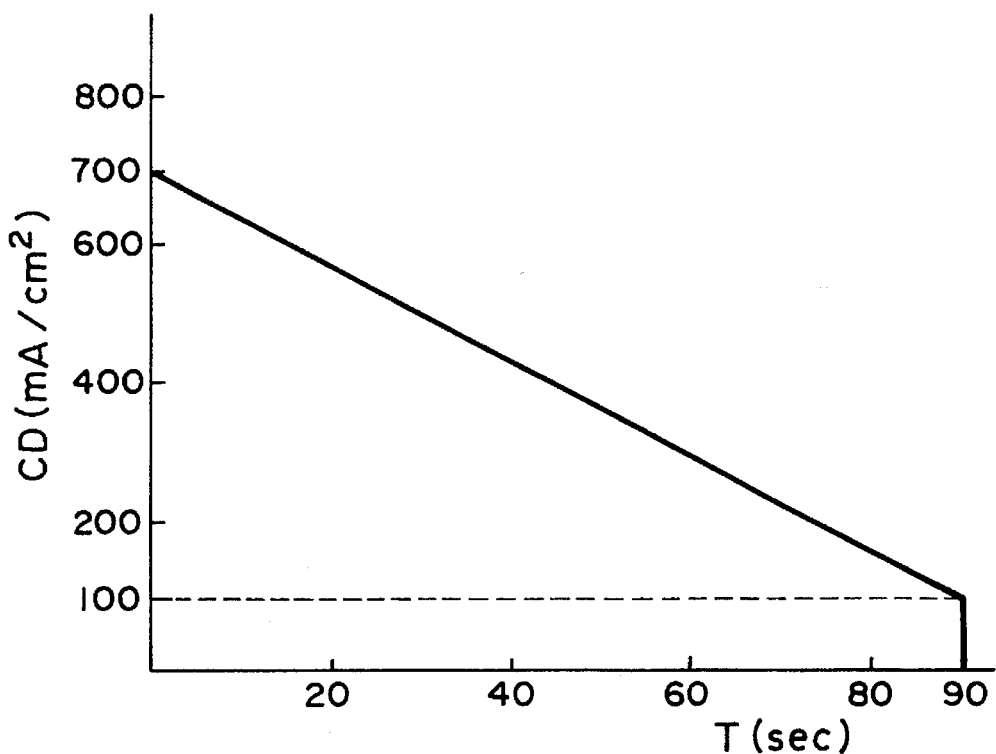
FIG. 8 is a graph of the current density showing a eighth Example of the present invention.
Figure 9:
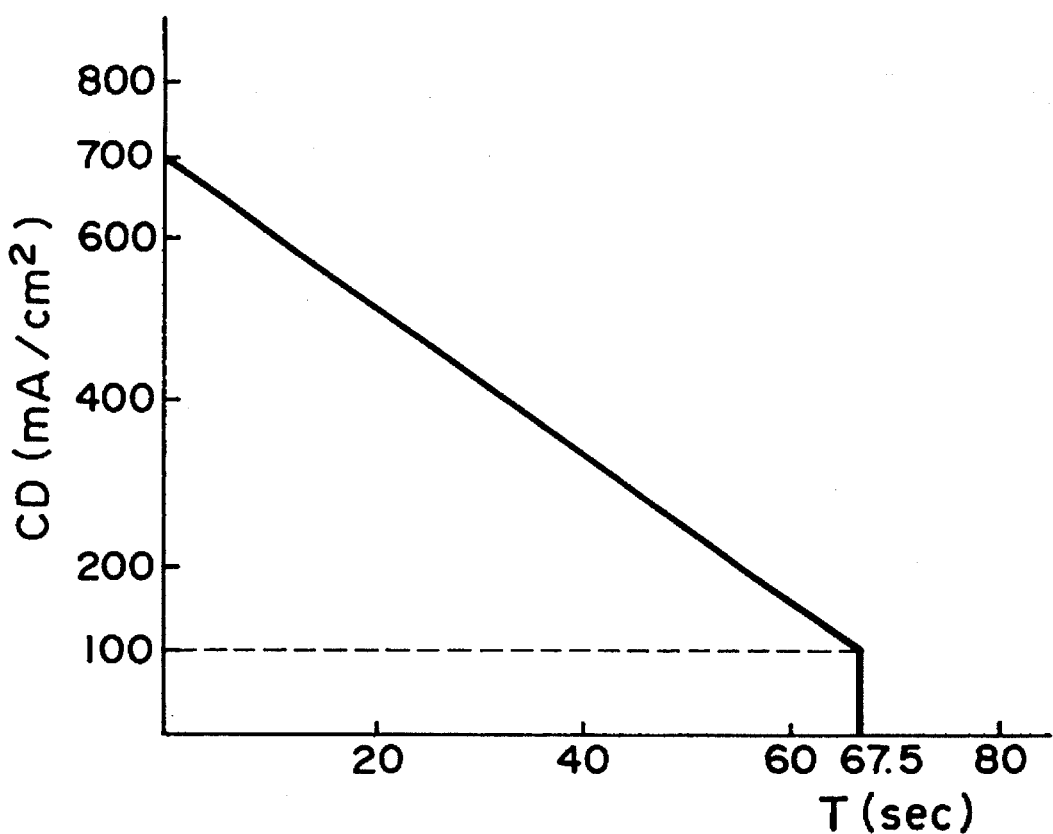
FIG. 9 is a graph of the current density showing a ninth Example of the present invention.
Figure 11:
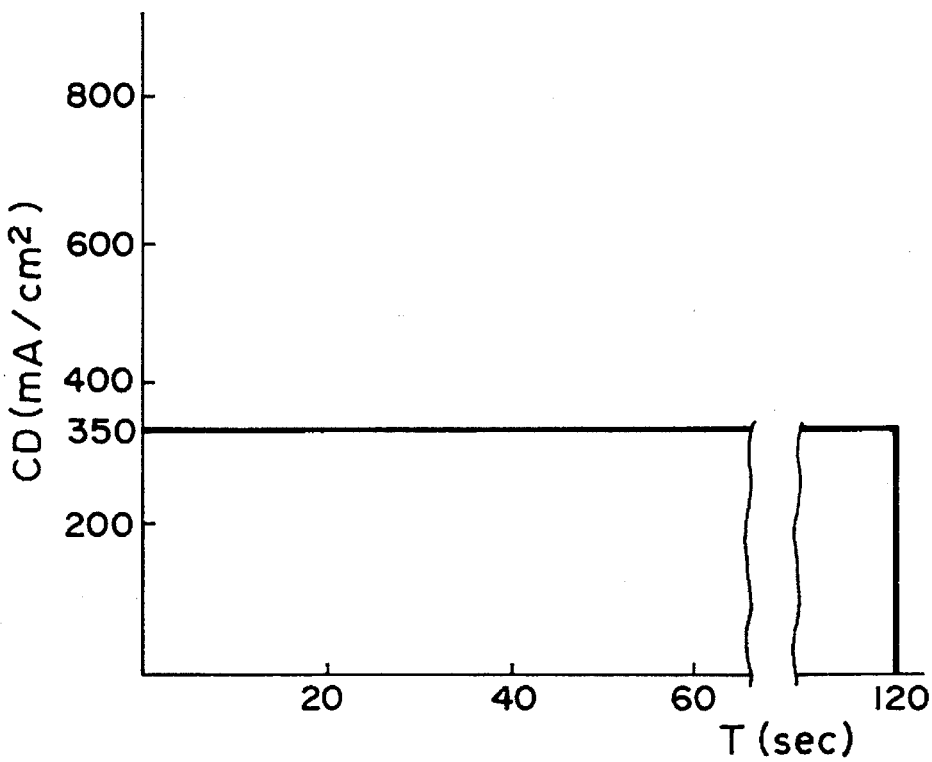
FIG. 11 is a graph of the current density by another conventional method.

FIGS. 8, 9, and 11 show the current densities of the eighth Example, the ninth Example, and another conventional Example. Herein, as an aluminum foil, a soft tempered material having a high cubic texture with a purity of 99.99% and a thickness of 140 μm was used. As an electrolyte, a solution containing 2.0% by weight of hydrochloric acid and 20.0% by weight of sulfuric acid was used and the first etching was carried out in the solution to form tunnel pits. Referring to FIG. 8, the current density of the eighth Example was decreased continuously from 700 $mA/cm^2$ and after 90 sec the current density was caused to reach an end value of 100 $mA/cm^2$. Referring to FIG. 9, the current density of the ninth Example was decreased from 700 $mA/cm^2$ and after 67.5 sec the current density was caused to reach an end value of 100 $mA/cm^2$.

FIG. 11 shows another conventional Example wherein the current density was kept at a constant value of 350 $mA/cm^2$ and after 120 sec the current density was caused to reach the end. Table 2 shows properties of the aluminum etched foils that were obtained by subjecting each of the thus obtained foils to the second step of chemical etching in the electrolyte to grow and enlarge the tunnel pits, then rinsing the foil with water, drying it, and subjecting it to the conventional formation treatment at 360 V that is generally carried out.

TABLE 1

| | Current density | Etch coulombs (coulombs/$cm^2$) | Capacitance ($\mu F/cm^2$) | Weight loss ($g/m^2$) | Bending strength (times) |
| --- | --- | --- | --- | --- | --- |
| Example 1 | FIG. 1 | 24 | 1.20 | 110 | 22 |
| Example 2 | FIG. 2 | 24 | 1.21 | 110 | 19 |
| Example 3 | FIG. 3 | 24 | 1.19 | 110 | 20 |
| Example 4 | FIG. 4 | 24 | 1.20 | 110 | 19 |
| Example 5 | FIG. 5 | 24 | 1.20 | 110 | 21 |
| Example 6 | FIG. 6 | 24 | 1.20 | 110 | 20 |

TABLE 1-continued

|  | Current density | Etch coulombs (coulombs/ cm$^2$) | Capacitance ($\mu$F/cm$^2$) | Weight loss (g/m$^2$) | Bending strength (times) |
| --- | --- | --- | --- | --- | --- |
| Example 7 | FIG. 7 | 18 | 1.12 | 90 | 20 |
| Conventional Example 1 | FIG. 10 | 24 | 1.12 | 110 | 18 |

TABLE 2

|  | Current density | Etch coulombs (coulombs/ cm$^2$) | Capacitance ($\mu$F/cm$^2$) | Weight loss (g/m$^2$) | Bending strength (times) |
| --- | --- | --- | --- | --- | --- |
| Example 8 | FIG. 8 | 36 | 1.25 | 127 | 20 |
| Example 9 | FIG. 9 | 27 | 1.18 | 112 | 19 |
| Comparative Example 2 | FIG. 11 | 36 | 1.18 | 127 | 18 |

Figure 12:
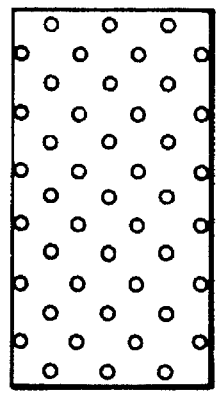
FIG. 12 is a reference diagram showing the process wherein pits are formed in the step of forming pits.
Figure 12:
Figure 12:
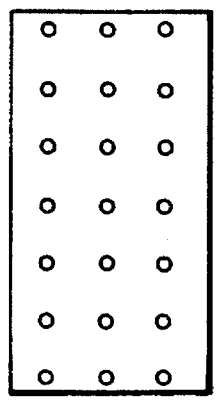
Figure 12:
Figure 12:
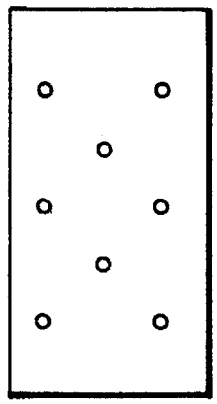

FIG. 12 shows the process wherein pits are formed in the step of forming pits.

Although, in the above Examples, the step of enlarging the pits was carried out by chemical etching, instead electrolytic etching can be carried out. As apparent from the above-described Examples, in comparison with the aluminum electrode foil etched by the conventional method, the aluminum electrode foils obtained by the present method are improved in etching efficiency to an extent of as highest as about 18%. This also means a reduction in the quantity of electricity consumed in etching and therefore it is expected that the cost can be reduced.

Further, since the maximum current density is twice or more as large as the case of the conventional method, even if the same quantity of electricity for electrolysis is used, the etching time can be effectively reduced.

What is claimed is:

1. A method of etching an aluminum foil for electrolytic capacitors, comprising the following steps: electrolytically etching an aluminum foil for electrolytic capacitors that has a high cubic texture in an electrolyte containing a chloride to form pits, in which electrolytic etching step the current density is decreased continuously from a maximum value, and enlarging the pits formed in the above step by etching.

2. The method of etching an aluminum foil for electrolytic capacitors as claimed in claim 1, wherein said step of enlarging the pits is carried out by chemical etching.

3. The method of etching an aluminum foil for electrolytic capacitors as claimed in claim 1, wherein said step of enlarging the pits is carried out by electrolytic etching.

4. The method of etching an aluminum foil for electrolytic capacitors as claimed in claim 1, wherein the current density applied in said step of forming pits is increased quickly from 0 to a maximum value.

5. The method of etching an aluminum foil for electrolytic capacitors as claimed in claim 1, wherein the ratio of A/B is in the range of 0 to 0.4 wherein A denotes the time taken by the current density in said step of forming pits to reach a maximum value and B denotes the time taken by said current density to reach a final value from the maximum value.

6. The method of etching an aluminum foil for electrolytic capacitors as claimed in claim 1, wherein in said step of forming pits the maximum current density is 350 to 1,000 mA/cm$^2$ and the current density at the end is 0 to 300 mA/cm$^2$.

7. The method of etching an aluminum foil for electrolytic capacitors as claimed in claim 1, wherein the electrolyte used in said step of forming pits contains 1.0 to 4.0% by weight of hydrochloric acid and 15 to 30% by weight of an acid capable of forming an oxide film, and has a temperature of 65° to 90 ° C.

8. The method of etching an aluminum foil for electrolytic capacitors as claimed in claim 7, wherein said acid capable of forming an oxide film is one or a combination of sulfuric acid, phosphoric acid, nitric acid, and oxalic acid.

9. A method of etching an aluminum foil for electrolytic capacitors, comprising the following steps: electrolytically etching an aluminum foil for electrolytic capacitors that has a high cubic texture in an electrolyte containing a chloride to form pits, in which electrolytic etching step the current density is decreased gradually stepwise from a maximum value, and enlarging the pits formed in the above step by etching.

10. The method of etching an aluminum foil for electrolytic capacitors as claimed in claim 9, wherein the change in the current density between the steps through which the current density is decreased from its maximum value is 0 to 200 mA/cm$^2$ and the retention time of the constant current density in each of the steps is 0 to 15 sec.

11. The method of etching an aluminum foil for electrolytic capacitors as claimed in claim 10, wherein the current density applied in said step of forming pits is increased quickly from 0 to a maximum value.

12. The method of etching an aluminum foil for electrolytic capacitors as claimed in claim 10, wherein the ratio of A/B is in the range of 0 to 0.4 wherein A denotes the time taken by the current density in said step of forming pits to reach a maximum value and B denotes the time taken by said current density to reach the final value from the maximum value.

13. The method of etching an aluminum foil for electrolytic capacitors as claimed in claim 10, wherein in said step of forming pits the maximum current density is 350 to 1,000 mA/cm$^2$ and the current density at the end is 0 to 300 mA/cm$^2$.

14. The method of etching an aluminum foil for electrolytic capacitors as claimed in claim 10, wherein the electrolyte used in said step of forming pits contains 1.0 to 4.0% by weight of hydrochloric acid and 15 to 30% by weight of an acid capable of forming an oxide film, and has a temperature of 65° to 90 ° C.

15. The method of etching an aluminum foil for electrolytic capacitors as claimed in claim 10, wherein said acid capable of forming an oxide film is one or a combination of sulfuric acid, phosphoric acid, nitric acid, and oxalic acid.

16. The method of etching an aluminum foil for electrolytic capacitors as claimed in claim 9, wherein said step of enlarging the pits is carried out by chemical etching.

17. The method of etching an aluminum foil for electrolytic capacitors as claimed in claim 9, wherein said step of enlarging the pits is carried out by electrolytic etching.

* * * * *